United States Patent
Osoekawa et al.

(10) Patent No.: US 11,302,039 B2
(45) Date of Patent: Apr. 12, 2022

(54) WAVEFORM ANALYZER

(71) Applicant: SHIMADZU CORPORATION, Kyoto (JP)

(72) Inventors: Takeshi Osoekawa, Ohta (JP); Yusuke Hida, Atsugi (JP); Yuzi Kanazawa, Setagaya (JP); Shinji Kanazawa, Kyoto (JP); Yohei Yamada, Kyoto (JP); Hiroyuki Yasuda, Kyoto (JP); Akihiro Kunisawa, Kyoto (JP); Hidetoshi Terada, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/760,118

(22) PCT Filed: Nov. 9, 2017

(86) PCT No.: PCT/JP2017/040486
§ 371 (c)(1),
(2) Date: Apr. 29, 2020

(87) PCT Pub. No.: WO2019/092836
PCT Pub. Date: May 16, 2019

(65) Prior Publication Data
US 2020/0279408 A1 Sep. 3, 2020

(51) Int. Cl.
G06T 11/00 (2006.01)
G06T 7/12 (2017.01)
(Continued)

(52) U.S. Cl.
CPC ............. *G06T 11/001* (2013.01); *G06N 3/04* (2013.01); *G06N 3/08* (2013.01); *G06T 7/12* (2017.01);
(Continued)

(58) Field of Classification Search
CPC .......... G06N 3/04; G06N 3/0427; G06N 3/08; G06N 3/086; G06T 11/001; G06T 11/005;
(Continued)

(56) References Cited

U.S. PATENT DOCUMENTS

| 5,920,297 A | * | 7/1999 | Alexander | G09G 5/02 345/83 |
| 2009/0225083 A1 | * | 9/2009 | Thomas | G01R 13/029 345/440 |
| 2019/0064130 A1 | | 2/2019 | Kanazawa et al. | |

FOREIGN PATENT DOCUMENTS

| CN | 103439743 A | * | 12/2013 | ............... G01V 1/34 |
| JP | 06-094696 A | | 4/1994 | |

(Continued)

OTHER PUBLICATIONS

"Intelligent Waveform-Processing Algorithm for Improving Efficiency of Analytical Task", Oct. 23, 2017, Shimadzu Corporation.
(Continued)

*Primary Examiner* — Sean M Conner
*Assistant Examiner* — Stephen M Brinich
(74) *Attorney, Agent, or Firm* — Sughrue Mion, PLLC

(57) ABSTRACT

A model constructed by a training process using the technique of deep learning using the training data including images created from a large number of chromatograms and correct peak information is previously stored in a trained model storage section. When chromatogram data for a target sample acquired with an LC measurement unit are inputted, an image creator converts the chromatogram into an image and creates an input image in which one of the two areas divided by the chromatogram curve as the boundary in the image is filled. A peak position estimator inputs the pixel values of the input image into a trained model using a neural network, and obtains the position information of the starting point and/or ending point of the peak and a peak detection
(Continued)

confidence as the output. A peak determiner determines the starting point and/or ending point of each peak based on the peak detection confidence.

15 Claims, 5 Drawing Sheets

(51) Int. Cl.
*G06N 3/08* (2006.01)
*G06T 7/70* (2017.01)
*G06N 3/04* (2006.01)

(52) U.S. Cl.
CPC ...... *G06T 7/70* (2017.01); *G06T 2207/10016* (2013.01); *G06T 2207/20081* (2013.01); *G06T 2207/20084* (2013.01); *G06T 2207/20221* (2013.01)

(58) Field of Classification Search
CPC ..... G06T 7/12; G06T 7/11; G06T 7/70; G06T 7/73; G06T 2207/10016; G06T 2207/10024; G06T 2207/20081; G06T 2207/20084; G06T 2207/20221; G06T 2207/20212

USPC .......................... 382/103, 270, 273, 173, 180
See application file for complete search history.

(56) References Cited

FOREIGN PATENT DOCUMENTS

| JP | 09-054071 A | 2/1997 | |
|---|---|---|---|
| JP | 2009-008582 A | 1/2009 | |
| WO | WO-2008028139 A2 * | 3/2008 | ............... G01V 1/34 |
| WO | 2017/094170 A1 | 6/2017 | |

OTHER PUBLICATIONS

"Small Start Service Using Deep Learning Technology to Assist Introduction of Predictive Analysis", Wave, May 2017, vol. 21.
Wei Liu et al., "SSD: Single Shot MultiBox Detector", arXiv.org, Dec. 29, 2016.
Takanori Ogata, "SSD: Single Shot MultiBox dDetector", ECCV2016.
International Search Report for PCT/JP2017/040486 dated Jan. 30, 2017 [PCT/ISA/210].
Written Opinion for PCT/JP2017/040486 dated Jan. 30, 2017 [PCT/ISA/237].

* cited by examiner

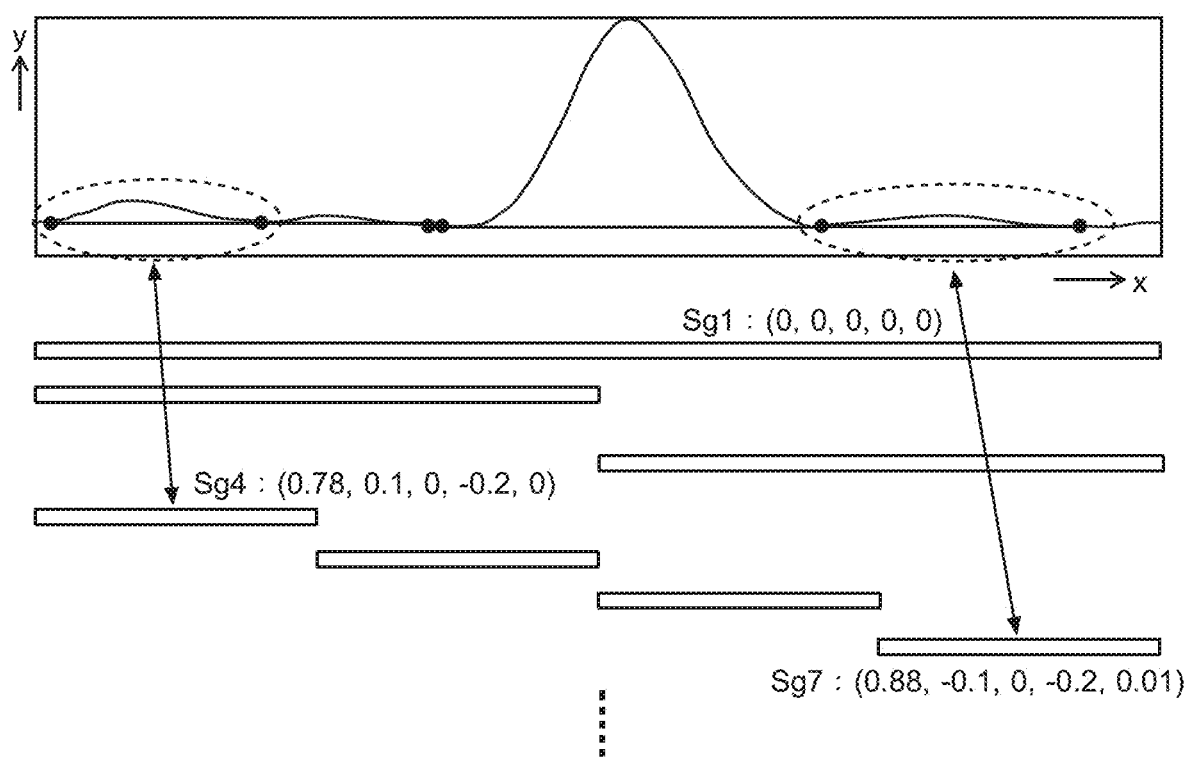

WAVEFORM ANALYZER

CROSS REFERENCE TO RELATED APPLICATIONS

This application is a National Stage of International Application No. PCT/US2017/040486 filed Nov. 9, 2017.

TECHNICAL FIELD

The present invention relates to a waveform analyzer configured to analyze the waveform of a signal acquired with an analyzing device. For example, the present invention is suitable for an analysis of the waveform of a signal acquired with various analyzing devices, such as a chromatogram waveform acquired with a gas chromatograph (GC), liquid chromatograph (LC) or similar apparatus, a mass-spectrum waveform acquired with a mass spectrometer, an absorption-spectrum waveform acquired with a spectrophotometer or similar apparatus, as well as an X-ray-spectrum waveform acquired with an X-ray analyzer.

BACKGROUND ART

In a gas chromatograph or liquid chromatograph apparatus, a sample containing various components is introduced into a column. While the sample is passing through the column, the various components are separated from each other in the temporal direction. The separated components are detected with a detector located at the exit end of the column. Based on the detection signal acquired with the detector, a chromatogram is created, on which a peak corresponding to a component in the sample appears. Since the point in time where the peak is observed (retention time) corresponds to the kind of component, it is possible to identify the component from the retention time of the peak, i.e. to perform a qualitative analysis. Furthermore, since the height or area of the peak corresponds to the concentration or content of the component, it is possible to determine the concentration or content of the component from the height value or area value of the peak, i.e. to perform a quantitative analysis.

In order to perform a qualitative or quantitative analysis, it is necessary to correctly detect a peak on a chromatogram waveform and determine the starting and ending positions (points in time) of the peak. An actual chromatogram waveform has such problems as the superposition of various types of noise, fluctuation of the baseline, or overlap of the peaks originating from a plurality of kinds of components. Therefore, it is difficult to correctly detect a peak from a chromatogram waveform. As for the peak detection methods based on chromatogram waveforms, various algorithms have been proposed to date and put to practical use (for example, see Patent Literature 1 or 2).

In a conventionally and commonly used peak detection algorithm, the height value or area value of a peak on an actual chromatogram waveform is calculated after the waveform processing which includes the steps of removing noise (e.g. smoothing), detecting the peak position, estimating the baseline, detecting the starting and ending points of the peak, as well as separating the overlapping peaks. In some algorithms, the estimation of the baseline as well as the detection of the starting and ending points of the peak are performed before the detection of the peak position. In any case, the conventionally and commonly used peak detection algorithm requires an operator (i.e. a person in charge of the analysis) to perform a considerable number of tasks; for example, the operator needs to previously set various parameters, manually indicate the starting point and/or ending point of a peak observed on a chromatogram waveform on a display screen, or select a baseline which the operator considers to be suitable for separating the overlapping peaks. Furthermore, since it is from the start difficult to apply a single specific algorithm to chromatogram waveforms which vary in baseline shape or peak shape, the operator also needs to select an algorithm to be used from a plurality of peak detection algorithms prepared beforehand.

Such tasks are considerably burdensome for the operator and significantly hinder an improvement of the efficiency of the analytical task. Furthermore, since the analytical task requires a certain amount of skill and experience, only a limited group of individuals can take charge of the task. A variation in judgment depending on the operator is also inevitable. There is also room for an intentional operation by an operator. These factors make it difficult to ensure the accuracy, reproducibility or reliability of the analysis result.

Algorithms for automatically detecting the starting point and/or ending point of a peak have also been developed to decrease the burden of the work performed by the operator (for example, see Non Patent Literature 1). However, those algorithms still rely on the operator performing a considerable number of tasks. A further decrease in the burden on the operator has been demanded.

CITATION LIST

Patent Literature

Patent Literature 1: JP 2009-8582 A
Patent Literature 2: WO 2017/094170 A

Non Patent Literature

Non Patent Literature 1: "Interijento Na Hakei Shori Arugorizumu De Kaiseki Gyoumu Wo Kouritsuka (Intelligent Waveform-Processing Algorithm for Improving Efficiency of Analytical Task)", [online], [accessed on Oct. 23, 2017], Shimadzu Corporation, the Internet Non Patent Literature 2: "Diipu Raaningu Gijutsu Wo Katsuyou shita Sumooru Sutaato Saabisu De Yosoku Bwiseki Dounyuu Wo Shien (Small Start Service Using Deep Learning Technology to Assist Introduction of Predictive Analysis)", Wave 2017.5, vol. 21, [online], [accessed on Oct. 23, 2017], Toshiba Information Systems (Japan) Corporation, the Internet Non Patent Literature 3: Wei Liu and six other authors, "SSD: Single Shot Multibox Detector", [online], [accessed on Oct. 23, 2017], arXiv.org, the Internet Non Patent Literature 4: Takanori Ogata, "SSD: Single Shot MultiBox Detector (ECCV2016)", [online], [accessed on Oct. 24, 2017], slideshare, the Internet

SUMMARY OF INVENTION

Technical Problem

The present invention has been developed to solve the previously described problem Its main objective is to provide a waveform analyzer which reduces the amount of cumbersome operations or tasks performed by an operator, and yet allows for the peak detection with a high level of accuracy for various signal waveforms.

Solution to Problem

The present invention developed for solving the previously described problem is a waveform analyzer configured to analyze a signal waveform based on a signal sequence acquired by performing a predetermined analysis on a sample, so as to detect a peak on the signal waveform, the waveform analyzer including:

a) an image creator configured to create an input image by converting an original signal waveform or a secondary signal waveform derived from the original signal waveform into an image, dividing the image into a plurality of areas by a line corresponding to the signal waveform in the image, and filling at least a predetermined range from the line along the same line in one of the plurality of areas, using one or more colors distinguishable from the other range; and b) a peak detector configured to detect at least the position of the starting point or position of the ending point of one or more peaks appearing on a signal waveform in a target input image created by the image creator, using a trained model previously constructed by machine learning using input images created based on a plurality of reference signal waveforms whose starting points and ending points are known.

The "predetermined analysis" in the present invention is, for example, chromatographic analysis liquid chromatography or gas chromatography), mass spectrometry, ion mobility spectrometry, optical spectrometry (e.g. absorption spectrometry or fluorescence spectrometry), or X-ray analysis. The "signal waveform based on a signal sequence acquired by performing" such an analysis is a chromatogram waveform, spectrum waveform or the like showing a change in signal intensity with respect to a specific variable, such as time, mass-to-charge ratio, ion mobility, wavelength, or energy.

In the present invention, for example, the image creator converts the chromatogram waveform itself or a secondary signal waveform derived from the chromatogram waveform into an image. In this image, the signal waveform is represented by a line drawing, such as a straight line, curved or polygonal line. In one of the two areas formed by dividing the image by the aforementioned line as the boundary line, at least a predetermined range from the line along the same line is filled with one or more colors. It is preferable to entirely fill one of the two areas separated by the line corresponding to the signal waveform so that micro areas within one area can be distinguished from those within the other area. The filling may be made according to a gray scale or color scale. By this technique, medium tones can be given to the pixels according to the positional relationship between the boundary and each pixel in the vicinity of the line corresponding to the signal wavefor the vicinity of the boundary of the two areas.

The peak detector estimates the starting and ending points of a peak using a technique for detecting an object in an image by machine learning. That is to say, the peak detector is provided with a trained model constructed beforehand through machine learning using input images created based on a plurality of reference signal waveforms (normally, a considerable number of reference signal waveforms) in which the accurate starling and ending points of the peak are previously known. Upon receiving a target input image created by the image generator, the peak detector estimates the site corresponding to the starting or ending point of one or more peaks which appear on the signal waveform in the input image, based on the trained model, and recognize the estimated site as the starting or ending point of the peak or peaks. The position of the starting point and/or ending point of each peak detected in the image is obtained in the form of the pixel position information. By converting the pixel position information into parametric information, such as the time or wavelength, the starting point and/or ending point of the peak on the original signal waveform can be determined.

As one mode of the waveform analyzer according to the present invention, the image creator may be configured to generate one or more secondary signal waveforms from a single original signal waveform acquired by an analysis, and create a plurality of input images based on the plurality of signal waveforms, respectively, or create an input image by superposing the plurality of images on each other.

As a specific example, the image creator may be configured to create the input image by converting a signal waveform obtained by n-th order differentiation of an original signal waveform acquired by an analysis (where n is a positive integer) into an image along with the original signal waveform.

First-order differentiation of a signal waveform highlights a portion where the signal intensity significantly changes, i.e. the rise (starting point) and fall (ending point) of the peak. Second-order differentiation of a signal waveform highlights a portion where the extent of the change in signal intensity is significantly large. For example, the peak top of a bulging portion in a monotonically decreasing section of the waveform can be extracted by second-order differentiation. Accordingly, for example, an image based on a signal waveform obtained by first-order differentiation and/or second-order differentiation of the original signal waveform can be superposed on the image based on the original signal waveform to create the input image. Such an image allows for the estimation based on a greater number of kinds of information concerning the peak waveform and helps improve the peak detection accuracy.

As another mode of the waveform analyzer according to the present invention, the image creator may be configured to create the input image by creating an image in which a plurality of signal waveforms acquired by performing the same analysis on the same sample under different values of a parameter are superposed on each other, then dividing the created image into three or more areas by a plurality of lines respectively corresponding to the signal waveforms, and filling each of the three or more areas with a different color.

For example, if the analytical technique is an LC/MS analysis or GC/MS analysis, a mass chromatogram (extracted ion chromatogram) waveform at a target ion and one or more mass chromatogram (extracted ion chromatogram) waveforms at one or more qualifier ions can be used as the aforementioned plurality of signal waveforms. In this case, the aforementioned parameter is mass-to-charge ratio.

A plurality of signal waveforms acquired in the previously described manner normally have peaks appearing at the same position, while other elements of those waveforms, such as the baseline or noise, are not significantly similar to each other. Therefore, by creating an input image with a plurality of signal waveforms superposed and performing the peak detection based on this input image, it becomes easy to distinguish a peak from the baseline or noise. This improves the peak detection accuracy.

As still another mode of the waveform analyzer according to the present invention, the image creator may be configured to create the input image in which a plurality of signal waveforms acquired by repeating an analysis on a target sample a plurality of times are superposed on or combined with each other.

As with the previous mode, the present configuration also makes it easy to distinguish a peak from the baseline or noise, which improves the peak detection accuracy.

As still another mode of the waveform analyzer according to the present invention, the image creator may be configured to create the input image in which a simal waveform acquired for a target sample and a signal waveform acquired for a standard sample containing a target component in the target sample are superposed on or combined with each other.

This configuration also improves the peak detection accuracy, since the addition of the information concerning the signal waveform for a standard sample containing the target component enables rough determination of the peak-top position, peak width and other items of information concerning the peak corresponding to the target component.

In the waveform analyzer according to the present invention, various machine learning techniques can be used for constructing the trained model. It is preferable to construct the trained model by a general object detection algorithm using machine learning.

General object detection algorithms allow a number of detection ranges to be set within an image to be processed, and a section within which a peak is present can be learned in each detection range. As a result, various sizes of peaks can be exhaustively detected, and the peak detection can be performed with a high level of accuracy.

In the present invention, the trained model may be a model constructed by using deep learning, which is one technique of machine learning.

The use of deep learning (for example, see Non Patent Literature 2) for the training improves the accuracy of the image recognition and also improves the correctness of the peak detection.

Various algorithms have been proposed for the deep learning. For the present invention, it is preferable for the trained model to be a model constructed by using a convolutional neural network (CNN).

For example, the convolutional neural network in the present context is included in the algorithms called R-CNN (Regions with CNN features), SPP (Spatial Pyramid Pooling) net, Fast R-CNN, Faster R-CNN, YOLO (Your Only Look Once) and SDD (Single Short Multibox Detector). By the present configuration, a highly accurate peak detection can be performed at a high speed.

Advantageous Effects of Invention

The waveform analyzer according to the present invention eliminates the necessity of cumbersome tasks required in the various conventional peak detection algorithms, such as the tuning of the parameters for the detection, or the selection of an appropriate algorithm. The operator does not need to visually check the signal waveform and manually set the starting and ending points of the peak. Since personal habits or intentional operations by the operator cannot be included, a highly accurate peak detection independent of the operators can be automatically performed. Furthermore, since the signal waveform is handled as an image in the peak estimation, a result which agrees with human recognition or judgment can be easily obtained. This has the effect that it is easy to maintain consistency with the result of a correct peak detection obtained by the conventional method which relies on the manual operations.

BRIEF DESCRIPTION OF DRAWINGS

FIG. 7 is a model diagram for explaining the peak detection process using a trained model in the waveform analyzer according to the present embodiment.

DESCRIPTION OF EMBODIMENTS

One embodiment of the waveform analyzer according to the present invention is hereinafter described in detail.

Figure 1:
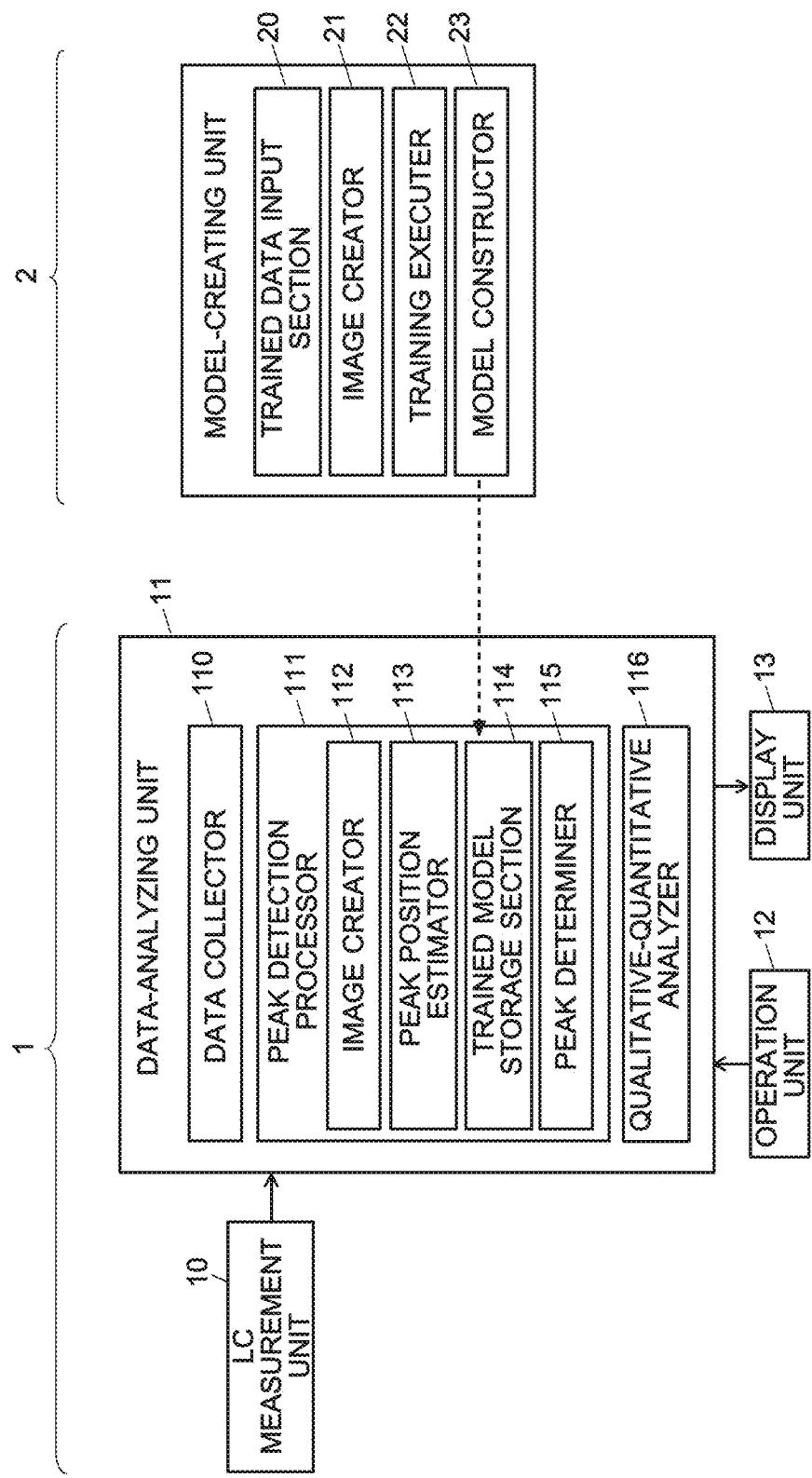
FIG. 1 is a schematic configuration diagram of a liquid chromatograph system using one embodiment of the waveform analyzer according to the present invention and a system for creating a trained model used for the liquid chromatograph system.

FIG. 1 is a schematic configuration diagram of a liquid chromatograph (LC) system using one embodiment of the waveform analyzer according to the present invention and a system for creating a trained model to be used in the LC system.

The LC system 1 includes an LC measurement unit 10, data-analyzing unit 1L operation unit 12 and display unit 13. Though not shown, the LC measurement unit 10 includes a liquid supply pump, injector, column, column oven, detector and other components. The LC measurement unit 10 performs an LC analysis on a given sample and acquires chromatogram data which show the temporal change of the intensity of the signal produced by the detector.

The data-analyzing unit 11 includes a data collector 110, peak detection processor 111, qualitative-quantitative analyzer 116 and other functional blocks. The peak detection processor 111 further includes an image creator 112, peak position estimator 113, trained model storage section 114, peak determiner 115 and other functional blocks.

In the data-analyzing unit 11, the data collector 110 collects and stores chromatogram data acquired by the LC measurement unit 10. The peak detection processor 11, which corresponds to the peak analyzer according to the present invention, automatically detects a peak on a chromatogram waveform based on the collected chromatogram data, and outputs peak information including the positions (retention times) of the starting and ending points of the detected peak. The qualitative-quantitative analyzer 116 identifies a component corresponding to each peak based on the peak information given from the peak detection processor 111 as well as calculates the peak height value or peak area value and computes the concentration or content of each component from that value.

In FIG. 1, the model-creating unit 2, which is separately provided from the LC system 1, includes a training data input section 20, image creator 21, training executer 22, and model constructor 23 as its functional blocks. A trained model created in this model-creating unit 2 is stored in a storage unit in the data-analyzer unit 11 of the LC system 1 and functions as the trained model storage section 114.

In common situations, the data-analyzing unit 11 is actually a personal computer or more sophisticated workstation on which predetermined software is installed, or a computer system including a high-performance computer connected to the aforementioned computer via communication lines. That is to say, the functions of the blocks included in the data-analyzing unit 11 can be embodied by a processing carried out by executing specific software installed on a single computer or a computer system including a plurality of computers, using various kinds of data stored on the computer or computer system.

The peak detection process carried out in the peak detection processor 111 is hereinafter described in detail.

Simply put, the peak detection processor 111 initially converts a chromatogram waveform (chromatogram curve) into a two-dimensional image and subsequently detects the positions of the starting and ending points of a peak by using the technique of deep learning, which is a technique of machine learning for detecting the category and position of an object present on the image.

[Creation of Trained Model]

Figure 2:
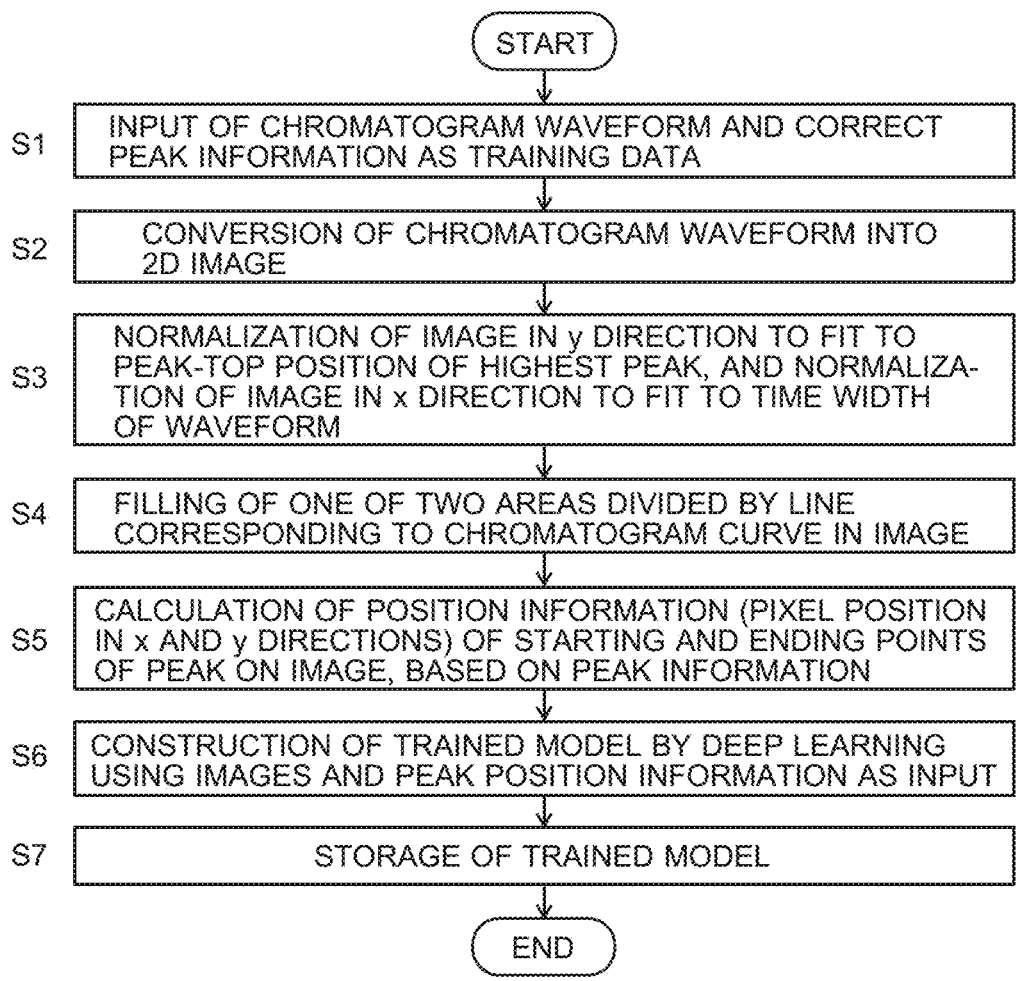
FIG. 2 is a flowchart showing the process flow of the creation of a trained model to be used in the waveform analyzer according to the present embodiment.

As is commonly known, the machine learning method requires a trained model to be constructed beforehand using a large number of sets of training data. As noted earlier, this task of constructing the trained model is not performed in the data-analyzing unit 11 which is a portion of the LC system 1; it is performed in the model-creating unit 2 consisting of a separate computer system, and the obtained result is stored in the trained model storage section 114. The reason for such a configuration is that the task of constructing a trained model normally includes an enormous amount of computation for processing a significant amount of data, which requires a computer that is sufficiently powerful and capable of image processing. FIG. 2 is a flowchart showing the flow of the processing performed in the model-creating unit 2 in creating the trained model.

For the creation of the trained model, it is necessary to prepare a large number and wide variety of chromatogram waveform data, as well as exactly determine the retention times of the starting and ending points of one or peaks which are present on each chromatogram waveform. The "wide variety of chromatogram waveform data" means chromatogram waveforms which contain such factors that possibly occur in a chromatogram waveform in an actual peak detection process, such as the mixture of various kinds of noise. change (drift) of the baseline, overlap of a plurality of peaks, or deformation of the peak shape. The training data input section 20 reads, as the training data, the large numberof sets of chromatogram waveform data combined with the exact peak information which includes the starting point and/or ending point of each peak (Step S1).

The image creator 21 creates a chromatogram based on the chromatogram waveform data, which is a time-series signal, and converts the chromatogram waveform (chromatogram curve) showing the change in signal intensity with the passage of time into a two-dimensional image having a predetermined number of pixels (Step S2). As one example, it is hereinafter assumed that the number of pixels in the present embodiment is 512×512. In this image conversion process, the size in the y direction of the waveform is normalized so that the peak top of the peak having the highest signal intensity among the peaks on the chromatogram waveform coincides with the upper side of the rectangular image. The size in the x direction of the waveform is also normalized so that the entirety of the measurement time range of the chromatogram waveform, or a portion of the measurement time range(e.g. a user-specified measurement time range), has a length that equals the length in the x direction (horizontal direction) of the rectangular image (Step S3).

With the chromatogram waveform normalized in the previously described manner, the rectangular image is divided into two areas by the boundary line corresponding to that waveform. Subsequently, one of the two areas formed by the image division is filled with a specified color different from the color of the other area (Step S4). It is preferable to define the color density in multiple tones and determine the color density of each pixel in the vicinity of the line corresponding to the waveform, i.e. the boundary line of the two areas, according to the positional relationship between the boundary line and the pixel. As a specific example, one area may be tilled with a 256-tone gray scale of 0 to 255, in which case the portion distant from the boundary line in one area is shown in black, the portion distant from the boundary line in the other area is shown in white, and the pixels in the vicinity of the boundary line are shown in intermediate colors.

Figure 4A:
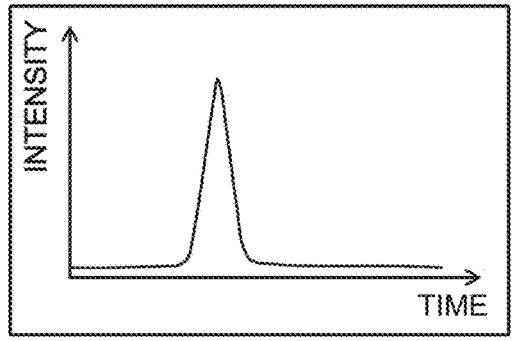
FIGS. 4A and 4B are diagrams showing one example of the creation of an image of a chromatogram waveform in the waveform analyzer according to the present embodiment.
Figure 4B:
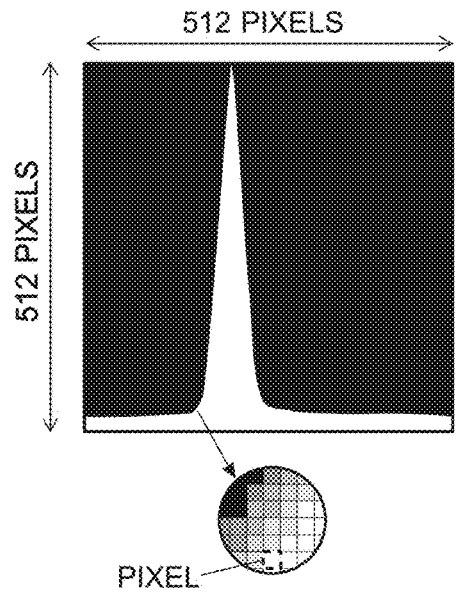

FIG. 4A shows one example of the chromatogram waveform, and FIG. 4B shows a two-dimensional image obtained by performing the image-creating operation on the chromatogram waveform according to Steps S2-S4. The colors of the pixels in an area near the boundary line of the two areas are schematically shown in the lower section of FIG. 49. In the present example, one of the two areas is entirely filled. This design allows different areas to be distinguished from each other by comparing a micro area (one pixel or a group of pixels) in one area with a micro area in the other area. This is convenient for improving the accuracy of the image recognition in the machine learning algorithm which will be described later. However, depending on the used machine learning algorithm, it may be unnecessary to entirely fill one of the two areas; for example, an image may be used in which only a narrow area extending along the entire boundary line and having a predetermined width from the boundary line is filled. Understandably, the filling operation may be performed using a color scale different from black, or a plurality of colors defined by a color palette. That is to say, the filling only needs to enable the distinction between the micro areas located on one side of the boundary line and those on the other side.

All sets of chromatogram waveform data read in Step S1 are similarly converted into images. As a result of the image-creating operation including the normalization of the chromatogram waveform, the intensity information and time information of the original chromatogram waveform are lost, and an image showing the waveform shape is created. It is naturally possible to perform the image-creating operation for the already read data according to Steps S2-S4 simultaneously with the data-reading operation in Step S1, instead of performing the processing of Steps S2-S4 after reading all sets of data in Step S1.

The image creator 21 converts the peak information combined with the chromatogram waveform data, into the information representing the position information on the image, i.e. the information of the pixel positions in the x and y directions, according to the normalization in the x and y directions in the previously described image-creating operation, i.e. the elongation and contraction of the chromatogram waveform (Step S5).

Next, the training executer 22 carries out machine learning using a large number of images created in the previously described manner from the chromatogram waveforms serving as the training data. Based on the result of the training, the model constructor 23 constructs a trained model to be used for estimating the starting and ending points of a peak on a chromatogram waveform. As is commonly known, there are various algorithms for the machine teaming. In the present embodiment, deep learning is used, which is one of the general object detection algorithms used in image recognition. More specifically, Single Short Multibox Detector (SSD) is used, which is particularly efficient in image recognition (Step S6).

SSD is one of the techniques which employ convolutional neural network (CNN), which is most commonly used in the area of deep learning. At present, SSD is an algorithm which can achieve the fastest speed and highest accuracy of recognition. SSD has been proposed by Liu Wei et al. in Non Patent Literature 3. Detailed descriptions of the algorithm are available in Non Patent Literature 3 or 4 or other related documents. Accordingly, the following description only deals with the characteristic points in the present embodiment.

A normal SSD method uses a feature map extracted by CNN in order to estimate a section within the two-dimensional image where an object is present. A variety of feature maps with various sizes (pixel numbers) are used by gradually convoluting the original feature map. By this technique, object-area candidates with various sizes can be detected. On the other hand, the object to be detected in the present embodiment is the positions of the starting and ending points of a peak in the x direction. Therefore, the algorithm has been modified so as to detect the presence of the starting and ending points of a peak within each of the sections which vary in size in the x direction.

Figure 5:
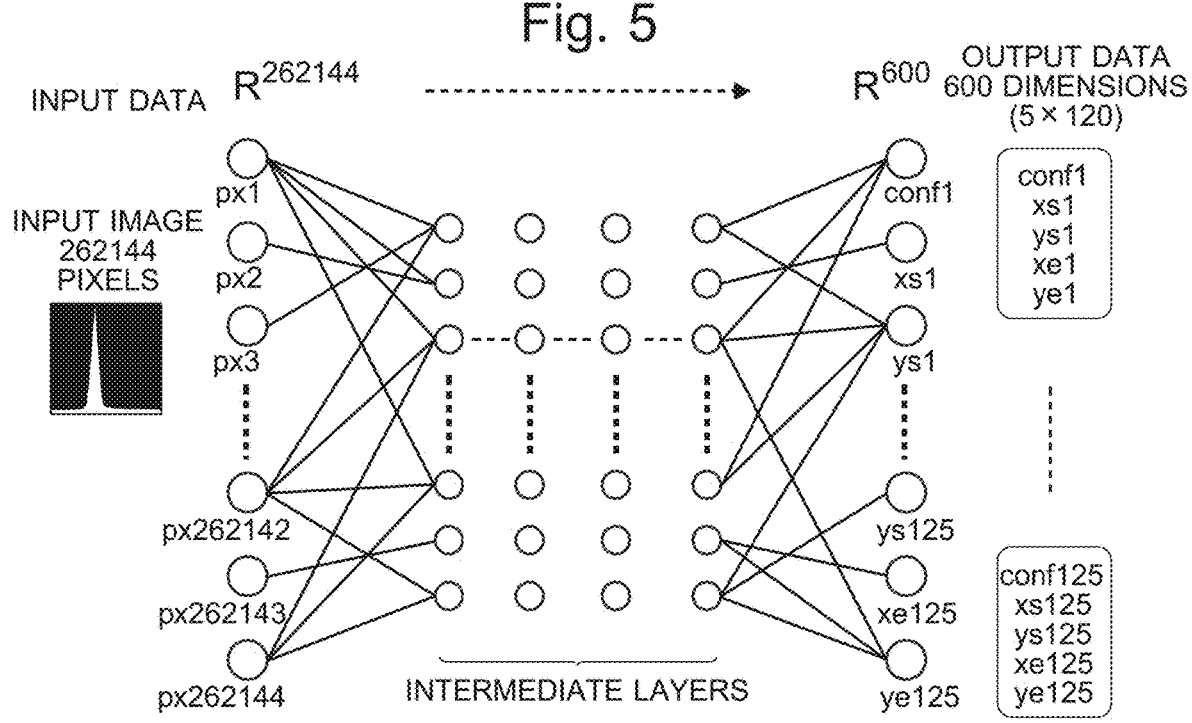
FIG. 5 is a model diagram showing a trained model using a neural network, to be used in the waveform analyzer according to the present embodiment.
Figure 6:
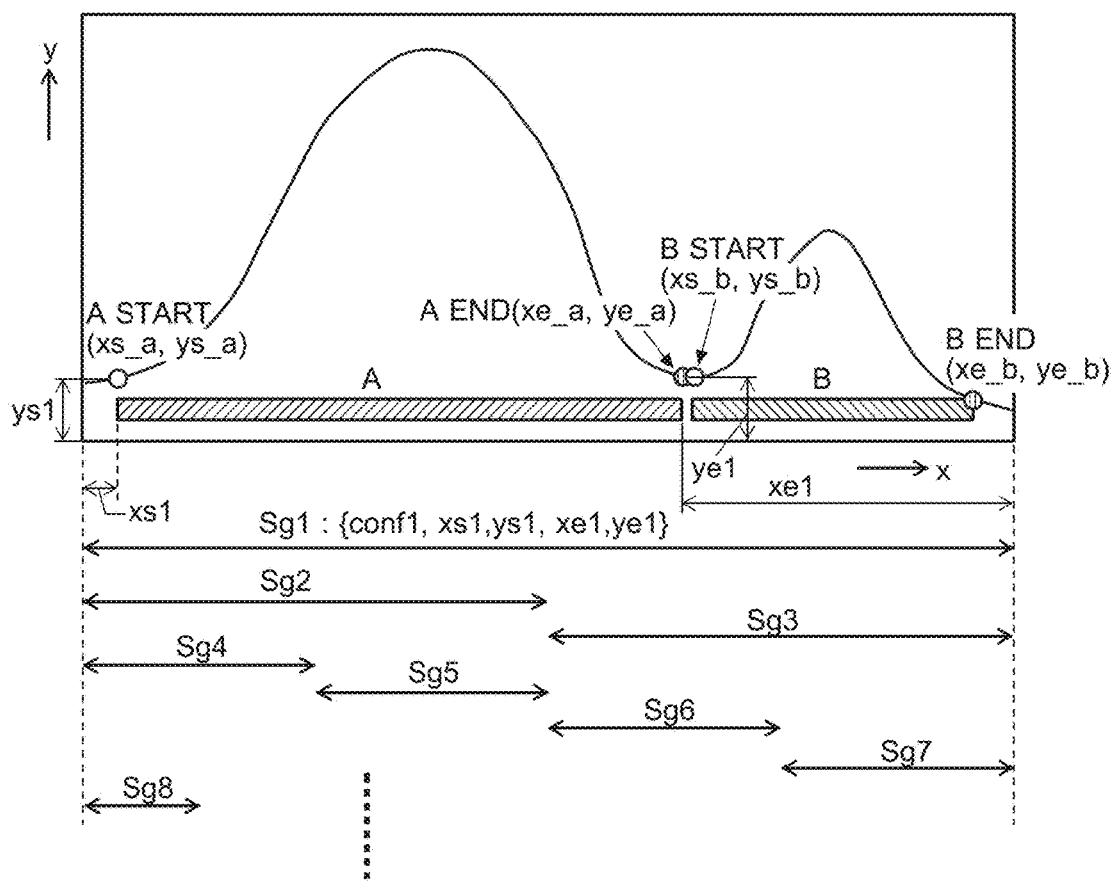
FIG. 6 is a model diagram for explaining the process of creating a trained model to be used in the waveform analyzer according to the present embodiment.

FIG. 5 is a model diagram showing a trained model using a neural network, to be used in the present embodiment. FIG. 6 is a model diagram for explaining the process of creating a trained model. As shown in FIG. 6, in the present example, a segment having a window whose width equals the entire length in x the direction of the image created through the processing of Steps S2-S4 is initially defined as "segment Sg1". The window of this segment Sg1 is subsequently divided into two sections to define segments Sg2 and Sg3 whose window width is equal to one half of the first window. Then, each of the windows of segments Sg2 and Sg3 is similarly divided into two sections to define four segments Sg4, Sg5, Sg6 and Sg7 whose window width is equal to one quarter of the original window. By repeating such operations, a total of 120 segments Sg1-Sg120 are defined. Each segment forms a unit for extracting a feature map by CNN. Based on the images prepared as the training data, the peak range defined by the starting and ending points of the peak is learned for each unit.

In the neural network in the present training model, as shown in FIG. 5, the pixel values (in the present embodiment, gray-scale values within a range of 0 to 255) of the pixels in the 512×512 pixel image are inputted to the 262,114 nodes provided in the input layer, respectively. In FIG. 5, pxn indicates the n-th pixel in one image. In the case of a colored image or an image composed of multiple colors, for example, the pixel values of the three primary colors are inputted for each pixel. Therefore, for example, the number of nodes of the input layer is increased by three times.

In the training executer 22, a network having a layered structure consisting of a large number of intermediate layers is trained by deep learning for the aforementioned input based on a large number of images, and numerical information is outputted from each of the 600 nodes provided in the ultimate output layer. The information outputted from the 600 nodes is five-dimensional information calculated for each of the 120 segments Sg1-Sg120, including the following elements: confidence of the peak detection, confn; offset in the x direction from the left end of the window of the segment to the starting point of the peak, xsn; offset in the y direction from the lower end of the input image to the starting point of the peak, ysn; offset in the x direction from the right end of the window of the segment to the ending point of the peak, xen; and offset in the y direction from the lower end of the input image to the ending point of the peak, yen. In FIG. 6, the five-dimensional information for the first segment Sg1 is expressed as {conf1, xs1, ys1, xe1, ye1}. In the present case, the confidence of the peak detection is defined as the length of the overlap of the peak range and the window.

In the example of FIG. 6, there are two peaks on the chromatogram waveform. The pixel position of the starting point of the first peak is (xs_a, ys_a), and that of the ending point is (xe_a, ye_a). The peak range is labeled as "A". As for the second peak, the pixel position of the starting point is (xs_b, ys_b), and that of the ending point is (xe_b, ye_b). The peak range is labeled as "B". In this case, xs1, ys1, xe1 and ye1 in segment Sg1 is as shown in FIG. 6. The value of "conf" is a value corresponding to the overlap of the window width of Sg1 and the peak range A. As noted earlier, the pixel positions of the starting point and/or ending point of the peak as well as the peak range in the training data are previously known. The model is constructed by repeatedly calculating the network weights in each intermediate layer through the training so that the matching with the correct values is maximally achieved for the large number of sets of training data.

The model constructor 23 temporarily stores the trained model obtained by performing the deep teaming using the large number of sets of training data (Step S7). The trained model created in the previously described manner in the model-creating unit 2 is transferred, for example, through communication lines and stored in the trained model storage section 114 in the data-analyzing unit 11 in the LC system 1.

[Peak Detection Process for Target Sample]

Figure 3:
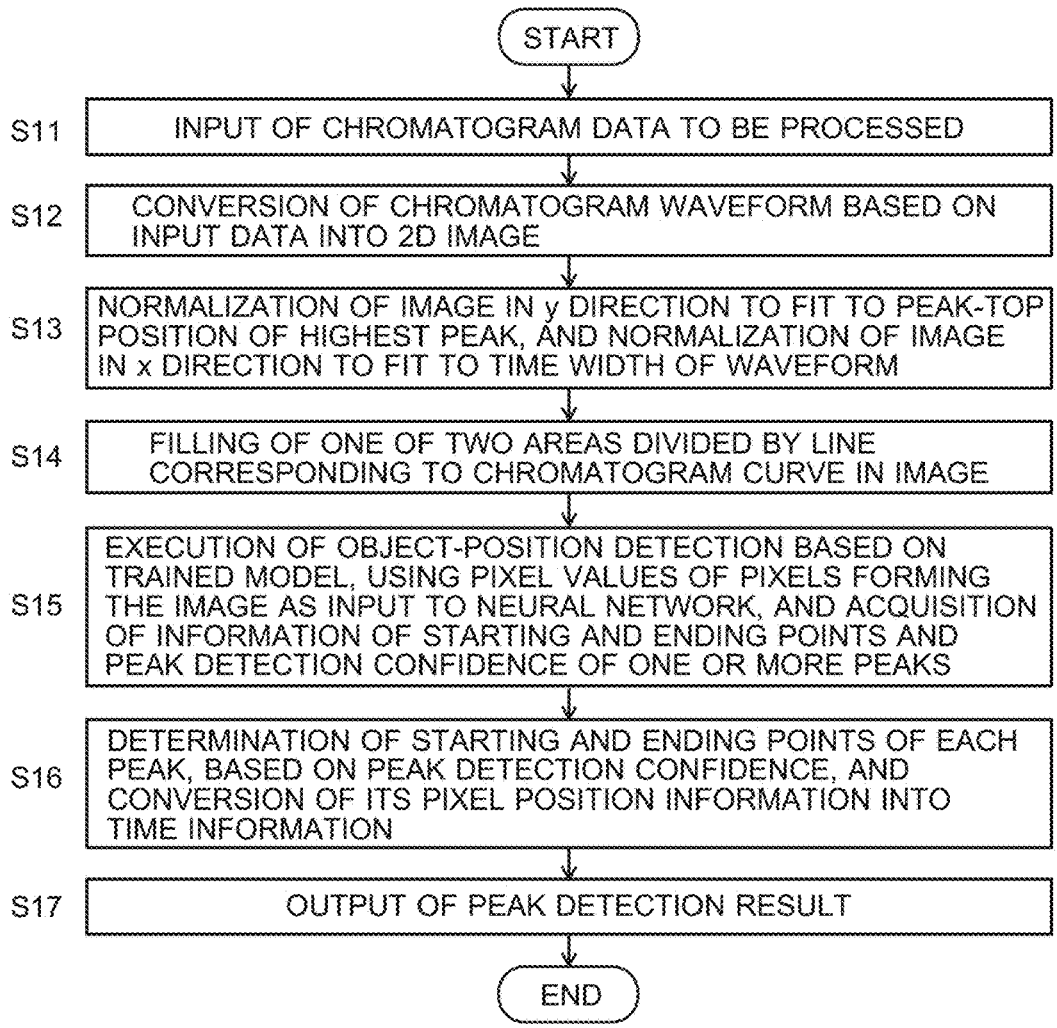
FIG. 3 is a flowchart showing the flow of the peak detection process in the waveform analyzer according to the present embodiment.

Next, the process of detecting a peak on a chromatogram waveform acquired for a target sample carried out in the data-analyzing unit 11 of the LC system 1 is described. FIG. 3 is a flowchart showing the flow of the p detection process performed in the peak detection processor 111.

Initially, the image creator 112 reads chromatogram waveform data to be processed from the data collector 110 (Step S11). Subsequently, the image creator 112 performs, on the read data, the processing of Steps S12-S14, which is similar to the creation of an image of the chromatogram waveform data according to Steps S2-S4 carried out by the image creator 21 of the model-creating unit 2, to create a 512×512 pixel image including a chromatogram curve.

The peak position estimator 113 applies the trained model stored in the trained model storage section 114 to the pixel values of the pixels of the created image, to obtain the five-dimensional information for each of the 120 segments. In other words, it obtains the information of the pixel positions which are estimated to be the starting and ending points of a peak in the image, along with the peak detection confidence (Step S15).

FIG. 7 shows one example of the peak detection result. The set of values {confn, xsn, ysn, xen, yen} is obtained for each segment (where n ranges from 1 to 120). Therefore, in many cases, a plurality of segments having {confn, xsn, ysn, xen, yen} with the peak detection confidence having a non-zero value are obtained for one peak. A low value of peak detection confidence confn normally means that the result is unreliable. Accordingly, in the present example, if the calculated value of confn is not greater than a predetermined value (in the present example, 0.5), the five-dimensional peak information is considered to be useless and represented by {0, 0, 0, 0, 0}. It is also possible to use all results without performing such a selection based on the confidence value.

As noted earlier, a plurality of candidates of the positions of the starting and ending points are normally obtained for one peak. The peak determiner 115 compares the peak confidences confn of the plurality of candidates obtained for each peak, and concludes that the candidate having the highest value of the confidence has the pixel positions of the starting and ending points of the peak in the image. Subsequently, based on the information concerning the elongation and contraction of the chromatogram waveform in the image creation process as the information concerning the time range of the chromatogram waveform converted into the image, the peak determiner 115 converts the pixel positions of the starting and ending points of the peak into time and intensity information (Step S16). The peak determiner 115 outputs the obtained information as the peak detection result (Step S17).

In the data-analyzing unit 11, the qualitative-quantitative analyzer 116 receives the peak detection result. Then, for example, it calculates the peak area value or peak height value of each peak, and computes the concentration or content of the target component by comparing the calculated value with a previously obtained calibration curve. If the component is unknown, the data-analyzing unit 11 identifies a component for each peak based on its retention time.

[Variations]

In the previously described embodiment, the deep learning is performed after the chromatogram waveform of a portion or the entirety of the measurement time is converted into an image. This can be changed into various modes for improving the peak detection accuracy.

For example, first-order differentiation of a chromatogram waveform in the temporal direction yields a first-order differentiated chromatogram waveform whose value becomes larger as the change in signal intensity becomes larger. This first-order differentiated chromatogram waveform has the largest value at the point in time where the slope of the original waveform is steepest within its rising or falling phase, as well as a value of zero at a point of inflection (e.g. peak top) or within a no-peak period during which the same value continues. Second-order differentiation of a chromatogram waveform in the temporal direction yields a second-order differentiated chromatogram waveform whose value becomes larger as the extent of the change in signal intensity becomes larger. For example, this second-order differentiated chromatogram waveform shows a large value at the top of a bulging peak formed by the superposition of another component on a monotonically increasing or decreasing slope in the rising or falling phase of the original chromatogram waveform. Accordingly, it is possible to create an image of the first-order differentiated chromatogram waveform as well as an image of the second-order differentiated chromatogram waveform in addition to the original chromatogram waveform, and use the pixel values of those images as input data for the neural network.

Thus, another signal waveform can be derived from the original chromatogram waveform, and the information of an image created from that signal waveform (pixel values of another image) can be added to the information of the image created from the original chromatogram waveform. The other signal waveform derived from the original chromatogram waveform may also be superposed on the original chromatogram waveform, with their respective time ranges adjusted to each other, to create a single image. In this case, the three or more areas divided by the lines corresponding to the plurality of signal waveforms within the image can be respectively filled with different colors.

In place of a chromatogram waveform acquired by performing one measurement for one sample, a plurality of chromatogram waveforms acquired by repeatedly performing a measurement multiple times for the same sample may be each converted into an image, and the obtained images may be used in the training process to create a trained model. It is also possible to create an image of a chromatogram waveform acquired by an actual measurement of a sample containing a target component as well as an image of a chromatogram waveform for a standard sample containing the target component (i.e. a standard chromatogram waveform), or create an image in which those chromatogram waveforms are superposed on each other, and use the obtained image in the training process to create a trained model.

In the LC system 1 shown in FIG. 1, if the detector in the LC measurement unit 10 is a mass spectrometer, i.e. if the LC measurement unit 10 is a liquid chromatograph mass spectrometer (LC-MS), a plurality of chromatograms at different mass-to-charge ratios can be obtained for one sample. Normally, in the case of a quantitative analysis, a chromatogram at the mass-to-charge ratio of a target ion which characterizes the target component (normally, an ion having the highest signal intensity), and one or more chromatograms at one or more mass-to-charge ratios of one or more qualifier ions which characterize the target component and have mass-to-charge ratios different from that of the target ion, are acquired. Since a peak corresponding to one target component appears on all of those chromatograms, it is possible to superpose two or more chromatogram waveforms including the chromatogram waveform of the target ion and one or more chromatogram waveforms acquired for one or more qualifier ions to create a single image and use the pixel values of this image as input data for the neural network, or to use the pixel values of a plurality of images created from those chromatogram waveforms as input data for the neural network.

The previously described embodiment is an example in which the waveform analyzer according to the present invention is applied to a chromatogram waveform acquired by a chromatograph apparatus, which is an LC or GC, to perform the peak detection. The present invention can also be used for the processing of signal waveforms acquired with various kinds of analyzing devices other than chromatograph apparatuses. For example, it is evident that the present invention can also be used for the detection of a peak appearing on other types of waveforms, such as a mass spectrum acquired with a mass spectrometer, optical spectrum acquired with various spectral analyzers (e.g. absorption spectrophotometer or fluorescence spectrophotometer), ion mobility spectrometer acquired with an ion mobility spectrum, or X-ray spectrum acquired with an X-ray analyzer.

In the previously described embodiment, SSD, which is a technique of deep learning, is used for creating a trained model. The algorithms that can be used in the present invention are not limited to SSD. They are also not limited to commonly known algorithms; any algorithm categorized as the general object detection algorithm for detecting an object in an image can be used, even if the algorithm is not commonly known at present. A machine learning technique that is not categorized as the deep learning may also be used.

Furthermore, it is evident that any change, modification or addition appropriately made within the spirit of the present invention in any aspect other than those already described will also fall within the scope of claims of the present application.

REFERENCE SIGNS LIST

1 . . . Liquid Chromatograph (LC) System
10 . . . LC Measurement Unit
11 . . . Data-Analyzing Unit
110 . . . Data Collector
111 . . . Peak Detection Processor
112 . . . Image Creator
113 . . . Peak Position Estimator
114 . . . Trained Model Storage Section
115 . . . Peak Determiner
116 . . . Qualitative-Quantitative Analyzer
12 . . . Operation Unit
13 . . . Display Unit
2 . . . Model-Creating Unit
20 . . . Training Data Input Section
21 . . . Image Creator
22 . . . Training Executer
23 . . . Model Constructor

The invention claimed is:

1. A waveform analyzer configured to analyze a signal waveform based on a signal sequence acquired by performing a predetermined analysis on a sample, so as to detect a peak on the signal waveform, the waveform analyzer comprising:
   a) an image creator configured to create an input image by converting an original signal waveform or a secondary signal waveform derived from the original signal waveform into an image, dividing the image into first and second areas by a line corresponding to the signal waveform in the image, and filling at least a part of the first area, using one or more colors distinguishable from the second area; and
   b) a peak detector configured to detect at least a position of a starting point or position of an ending point of one or more peaks appearing on a signal waveform in a target input image created by the image creator, using a trained model previously constructed by machine learning using input images created based on a plurality of reference signal waveforms whose starting points and ending points are known.

2. The waveform analyzer according to claim 1, wherein: the image creator is configured to generate one or more secondary signal waveforms from a single signal waveform acquired by an analysis, and create a plurality of input images based on the plurality of signal waveforms, respectively, or create an input image by superposing the plurality of input images on each other.

3. The waveform analyzer according to claim 2, wherein: the image creator is configured to create the input image by converting a signal waveform obtained by n-th order differentiation of an original signal waveform acquired by an analysis (where n is a positive integer) into an image along with the original signal waveform.

4. The waveform analyzer according to claim 1, wherein: the image creator is configured to create the input image by creating an image in which a plurality of signal waveforms acquired by performing a same analysis on a same sample under different values of a parameter are superposed on each other, then dividing the created image into three or more areas by a plurality of lines respectively corresponding to the signal waveforms, and filling each of the three or more areas with a different color.

5. The waveform analyzer according to claim 1, wherein: the image creator is configured to create the input image in which a plurality of signal waveforms acquired by repeating an analysis on a target sample a plurality of times are superposed on or combined with each other.

6. The waveform analyzer according to claim 1, wherein: the image creator is configured to create the input image in which a signal waveform acquired for a target sample and a signal waveform acquired for a standard sample containing a target component in the target sample are superposed on or combined with each other.

7. The waveform analyzer according to claim 1, wherein: the trained model is a model constructed by a general object detection algorithm using machine learning.

8. The waveform analyzer according to claim 7, wherein: the trained model is a model constructed by using deep learning.

9. The waveform analyzer according to claim 8, wherein: the trained model is a model constructed by using a convolutional neural network.

10. The waveform analyzer according to claim 2, wherein: the trained model is a model constructed by a general object detection algorithm using machine learning.

11. The waveform analyzer according to claim 3, wherein: the trained model is a model constructed by a general object detection algorithm using machine learning.

12. The waveform analyzer according to claim 4, wherein: the trained model is a model constructed by a general object detection algorithm using machine learning.

13. The waveform analyzer according to claim 5, wherein: the trained model is a model constructed by a general object detection algorithm using machine learning.

14. The waveform analyzer according to claim 6, wherein: the trained model is a model constructed by a general object detection algorithm using machine learning.

15. The waveform analyzer according to claim 1, wherein: the image creator is configured to create an input image by wholly filling the first area using one or more colors.

* * * * *